United States Patent [19]
Plantan et al.

[11] Patent Number: 5,787,794
[45] Date of Patent: Aug. 4, 1998

[54] MOUNTING BOLT FOR BRAKE ACTUATOR

[75] Inventors: Ronald S. Plantan; Duane J. Demus, both of Charlotte, N.C.

[73] Assignee: Indian Head Industries, Inc., Charlotte, N.C.

[21] Appl. No.: 877,167

[22] Filed: Jun. 17, 1997

[51] Int. Cl.⁶ ........................................... F01B 29/00
[52] U.S. Cl. ............................ 92/161; 92/63; 411/186
[58] Field of Search .............................. 411/186, 189, 411/155; 92/63, 128, 161, 146, 130 A

[56] References Cited

U.S. PATENT DOCUMENTS

| | | |
|---|---|---|
| 2,935,785 | 5/1960 | Hastings . |
| 3,056,443 | 10/1962 | Knocke ................................. 411/186 |
| 3,187,640 | 6/1965 | Young et al. . |
| 3,495,503 | 2/1970 | Gummer et al. . |
| 3,509,795 | 5/1970 | Woodward . |
| 3,515,438 | 6/1970 | Stevenson et al. ..................... 92/63 |
| 3,712,181 | 1/1973 | Swander, Jr. et al. . |
| 3,813,994 | 6/1974 | Swander, Jr. et al. . |
| 3,842,716 | 10/1974 | Swander, Jr. . |
| 3,908,520 | 9/1975 | Ma . |
| 3,926,094 | 12/1975 | Kurichh et al. . |
| 4,221,158 | 9/1980 | Klimek et al. . |
| 4,263,840 | 4/1981 | Herrera . |
| 4,516,893 | 5/1985 | Barth ................................... 411/186 |
| 4,784,046 | 11/1988 | Gautier ................................ 92/161 |
| 4,850,263 | 7/1989 | Rumsey et al. . |
| 4,887,513 | 12/1989 | Ewald et al. . |
| 5,016,523 | 5/1991 | Bowyer . |
| 5,067,846 | 11/1991 | Staniszewski ...................... 411/189 |
| 5,285,716 | 2/1994 | Thompson . |
| 5,377,579 | 1/1995 | Pierce . |

FOREIGN PATENT DOCUMENTS

| | | | |
|---|---|---|---|
| 52-63547 | 5/1977 | Japan ................................. 411/155 |
| 2-283910 | 11/1990 | Japan ................................. 411/155 |
| 0763619 | 9/1980 | U.S.S.R. ............................ 411/186 |

Primary Examiner—Thomas E. Denion
Attorney, Agent, or Firm—Howard & Howard

[57] ABSTRACT

An improved mounting bolt for attaching brake actuators to the frame of a vehicle includes a head having outermost portions which contact the service chamber housing, and inner portions which are spaced from the housing. The bolt spreads the force from carrying the brake actuator over a greater area on the service chamber housing and away from the bolt hole. The bolt preferably has a generally rectangular head.

9 Claims, 2 Drawing Sheets

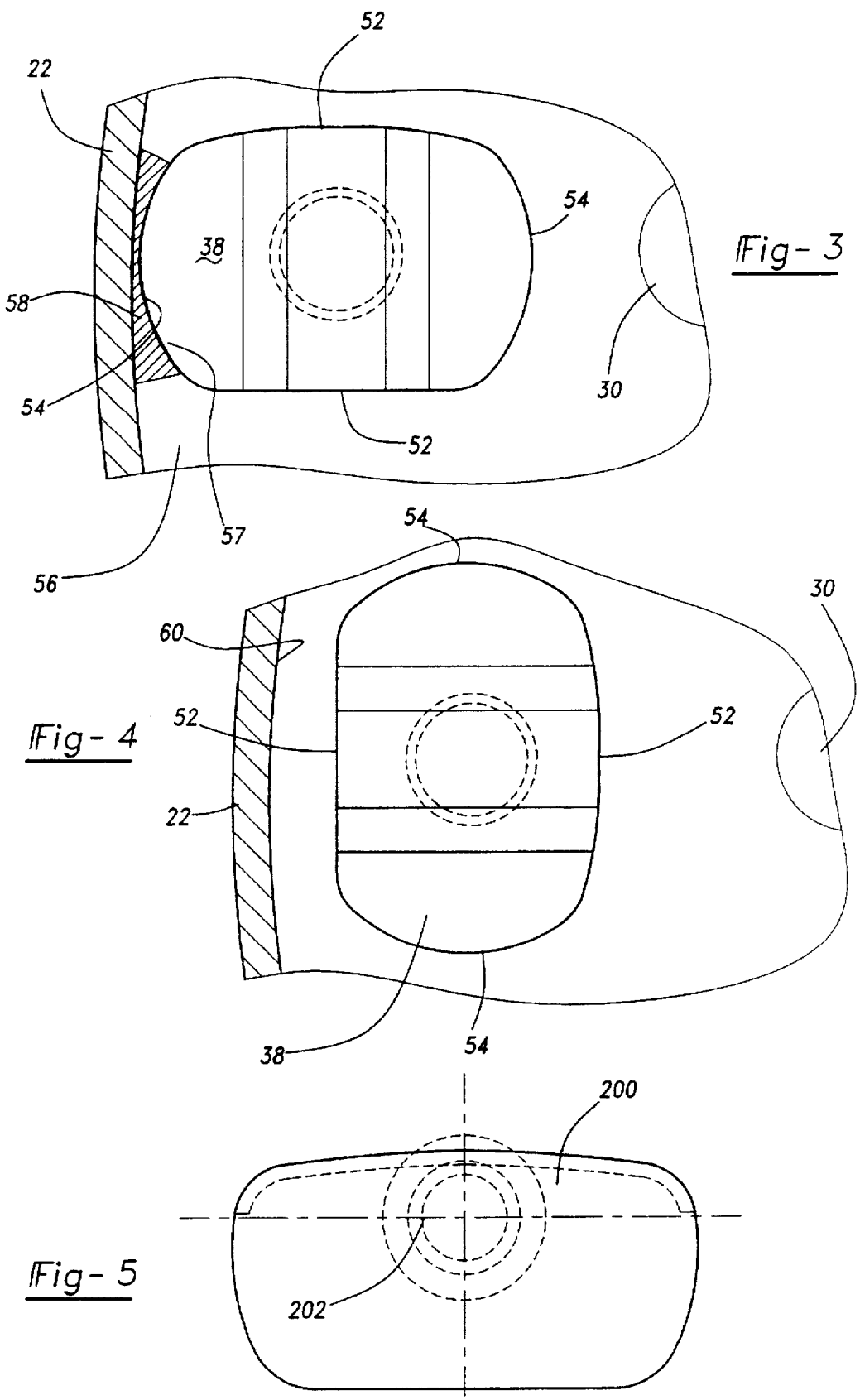

MOUNTING BOLT FOR BRAKE ACTUATOR

BACKGROUND OF THE INVENTION

This invention relates to a mounting bolt for brake actuators with a non-planar lower surface to spread the forces from the bolt over a greater area on the brake chamber housing.

In the prior art, brake actuators are typically mounted to a metal bracket by a pair of bolts. Typically, a brake actuator includes at least one chamber, and often two chambers, which are cantilever mounted to the bracket. A push rod moves through the brake chamber as is attached to a yoke. The yoke is mounted to a braking mechanism. Because of the cantilever mount a good deal of weight from the brake actuator is spaced from the bracket. Vibrations, the weight of the actuator, and other forces place a good deal of stress on the connection between the bolts and the brake housing.

The concentrated forces and stresses on the surface of the bolt, and the bolt hole often result in the brake chamber housing tearing about the hole. This is one of the major problems with spring brake actuator mounting systems.

The prior art has attempted to deal with this problem by utilizing cushions, by utilizing enlarged heads for the bolts, and by other ways for accommodating the stresses. These efforts have not been fully successful. One major cause of failure in a brake actuator still remains tearing of the housing in the area of the bolt and bolt hole.

SUMMARY OF THE INVENTION

In the disclosed embodiment of the invention, a brake actuator is connected to a bracket with at least a pair of bolts. The bolts include an enlarged head having a non-planar surface facing the brake actuator housing. The non-planar surface is shaped such that outer edges are spaced more toward the brake chamber than inner portions. The contact between the bolt and the brake chamber housing is spread outwardly of the threaded portion of the bolt and away from the bolt hole. This ensures that the forces from the bolt on the brake chamber are spread over a greater area, and reduces the likelihood of the brake chamber housing being torn by the forces passing through the bolt.

In preferred embodiments of this invention, the angle on the non-planar lower surface is less than ten degrees, and most preferably 1 to 3 degrees.

In preferred features of this invention, the bolt has a generally rectangular head with a major side and a minor side. In one embodiment, the bolts are aligned such that their major sides are parallel to each other, spaced apart from each other in the brake chamber housing and on opposed sides of the central push rod. In a second embodiment, the bolts are disposed with the minor sides being parallel. The bolts can be aligned in any of several ways to accommodate the particular brake chamber housing construction.

These and other features of the present invention can be best understood from the following specification and drawings, of which the following is a brief description.

BRIEF DESCRIPTION OF THE DRAWINGS

FIG. 3 is a view of a first arrangement of the bolt within a brake chamber housing.

FIG. 4 shows a second alternative arrangement of a bolt within a brake chamber housing.

FIG. 5 shows another embodiment bolt.

DETAILED DESCRIPTION OF A PREFERRED EMBODIMENT

Figure 1:
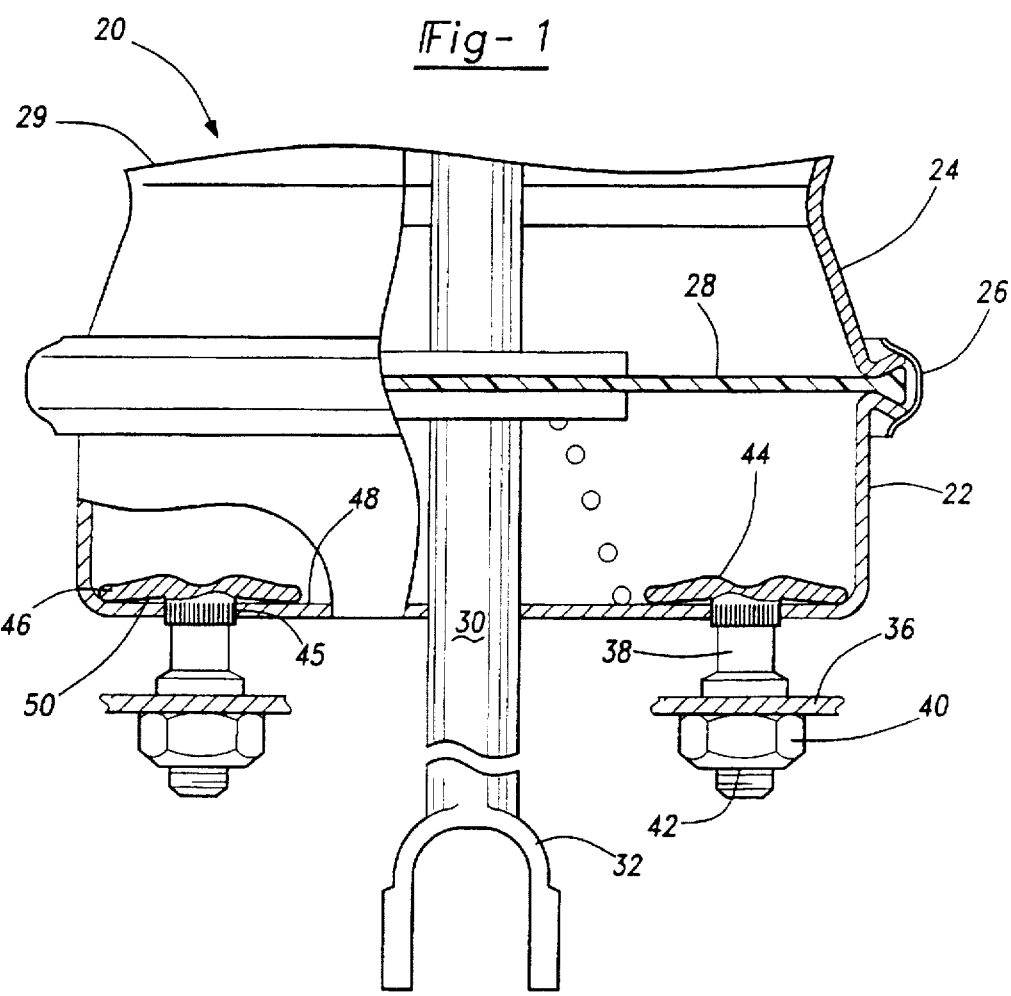
FIG. 1 shows a brake actuator incorporating the inventive bolts of this invention.

FIG. 1 shows a brake actuator 20. As is known, a service chamber housing 22 is attached to a center housing 24 such as by a clamp band 26. A diaphragm 28 is sealingly received between the housings 22 and 24. Although this invention is specifically disclosed with a dual-chamber brake actuator including a parking or emergency chamber 29 above the service chamber, this invention also extends to stand alone service chambers which have no parking chamber 29.

The service chamber defined between the housings 22 and 24 includes a push rod 30 which is connected to a yoke 32 which is, in turn, connected to a braking mechanism shown schematically. The push rod 30 moves inwardly and outwardly of the housing 22 to selectively actuate a brake.

The brake actuator is connected to a bracket 36, which is a metal plate fixed to a vehicle frame. The bracket 36 receives mounting bolts 38 having nut 40 received outwardly of the bracket 36. Threaded portion 42 extends through bracket 36 from a bolt head 44 and is secured by the nut 40. Bolt 38 extends through a hole 45 in housing 22. Bolt head 44 includes an outer portion 46 which is in contact with an inner surface 48 of the housing 22 and a laterally inner portion 50 which is angled away from the surface 48.

When the brake actuator 20 is mounted to the bracket 36, forces are transferred from the bolt 38 to the housing surface 48 at the outer portions 46. Thus, forces from the bolt are spread over a greater area on the housing and the likelihood of the housing tearing at hole 45 due to vibrations, weight, or other forces that are applied through the bolts 38 from the mounting of the brake actuator to the bracket 36 is reduced.

Figure 2:
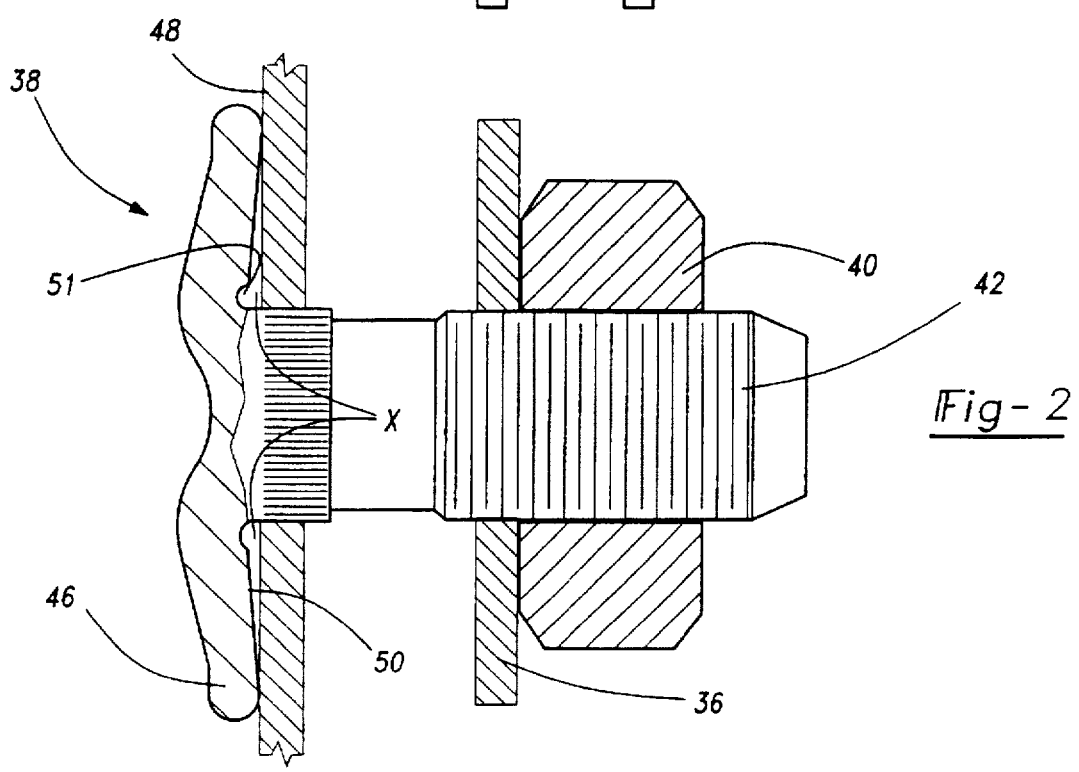
FIG. 2 is a view of a bolt in its mount according to this invention.

As shown in FIG. 2, the bolt 38 includes an outer portion 46 and the inner portion 50. The angle x as shown in this figure is slightly exaggerated to better illustrate the fact of the angle. Also, there is an undercut portion 51 between the inner portion 50 and the central portion of the bolt. The angle is preferably less than ten degrees. In one embodiment, the angle was 1.5 degrees.

FIG. 3 shows one embodiment of the bolt 38. As shown, the bolt 38 has major sides 52 and minor sides 54. Although only one bolt 38 is shown it should be understood a second is spaced on the opposed side of path rod 30. In this embodiment, the minor sides 54 are spaced in a parallel relationship on opposed sides of the central push rod 30. The major sides are generally coaxial. This arrangement is utilized for a housing having a surface 56 which allows placement of the bolt in this orientation. In such an orientation, if an outer end 57 of the bolt 38 is positioned near the surface 56, a weld 58 can be utilized to secure the bolt 38 to the housing 22.

FIG. 4 shows another arrangement of the bolt 38. In this arrangement, the major sides 52 of the bolt are aligned parallel to each other and spaced on opposed sides of the push rod 30. The minor sides 54 are coaxial when looked at on opposed sides of the push rod 30. This arrangement is utilized for a housing having a surface 60 which does not include the room for the generally outwardly extending end portion 57 as in the FIG. 3 embodiment.

A bolt head 200 is shown in FIG. 5. As shown, the bolt head 200 is off centered from the shaft 202 of the bolt. Such an embodiment is particularly useful when there is not sufficient space radially outwardly of where the bolt head will lie. The bolt head in this embodiment is otherwise functionally equivalent to those shown in the earlier embodiments.

Preferred embodiments of the present invention have been disclosed. However, a worker of ordinary skill in the art would recognize that certain modifications would come within the scope of this invention. For that reason, the following claims should be studied to determine the true scope and content of this invention.

We claim:

1. A brake actuator comprising:

a service chamber housing;

a second housing attached to said service chamber housing, a diaphragm secured between said second housing and said service chamber housing;

a push rod moveable with said diaphragm, said push rod extending through a central hole in said service chamber housing; and mounting bolts for securing said service chamber housing to a frame, said mounting bolts each including a central threaded portion extending through a bolt hole in said service chamber housing, said mounting bolts having a head extending laterally outwardly of said central threaded portion, said head having outermost portions which are in contact with said service chamber housing, and inner portions inward of said outermost portions, said inner portions extending away from said service chamber housing and connected to a central portion of said head which extends to said central threaded portion.

2. A brake actuator as recited in claim 1, wherein said head is generally rectangular and has a relatively long major side and a relatively short minor side.

3. A spring brake actuator as recited in claim 2, wherein there are at least two of said generally rectangular mounting bolts, and said generally rectangular mounting bolts have their major sides extending in spaced parallel relationship to each other and on opposed sides of said push rod, and said minor sides being generally coaxial to each other.

4. A brake actuator as recited in claim 2, wherein there are at least two of said generally rectangular bolts, and said generally rectangular bolts have their minor sides extending parallel to each other and spaced on opposed sides of said push rod, and their major sides extending generally coaxial to each other.

5. A brake actuator as recited in claim 1, wherein an angle drawn between a first line from said outermost portion to said innermost portion of said bolt head and a second line extending along said service chamber housing is less than ten degrees.

6. A brake actuator as recited in claim 1, wherein said second housing is a central housing of a dual-diaphragm brake actuator.

7. A vehicle braking system comprising:

a mounting bracket;

a brake actuator including a service chamber housing, a second housing attached to said service chamber housing, a diaphragm secured between said second housing and said service chamber housing, a push rod moveable with said diaphragm, said push rod extending through a central hole in said service chamber housing; and mounting bolts securing said service chamber housing to said bracket, said mounting bolts each including a central threaded portion extending through a bolt hole in said service chamber housing, said mounting bolts having a head extending laterally outwardly of said central threaded portion, and within said service chamber housing, said head having outermost portions which are in contact with a said service chamber housing, and inner portions laterally inwardly of said outer most portions, said inner portions extending away from said service chamber housing and connected to a central portion of the said head which extends to said central threaded portion, such that the forces and strains transferred from said bolts to said service chamber housing are spread outwardly and away from said bolt holes.

8. A braking system as recited in claims 7, wherein an angle drawn between a first line from said outermost portion to said inner portion of said bolt head and a second line extending along said service chamber housing is less than 10° C.

9. A braking system as recited in claim 8, wherein said second housing is the central housing of a dual-diaphragm brake actuator.

* * * * *